(12) United States Patent
Yoshida

(10) Patent No.: US 10,090,794 B2
(45) Date of Patent: Oct. 2, 2018

(54) MOTOR DRIVER

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/724,552

(22) Filed: Oct. 4, 2017

(65) Prior Publication Data

US 2018/0138852 A1   May 17, 2018

(51) Int. Cl.
| | |
|---|---|
| H02P 27/04 | (2016.01) |
| H02P 29/024 | (2016.01) |
| H02M 7/00 | (2006.01) |
| H02P 27/06 | (2006.01) |

(52) U.S. Cl.
CPC ........ *H02P 29/0241* (2016.02); *H02M 7/003* (2013.01); *H02P 27/06* (2013.01)

(58) Field of Classification Search
CPC .... B62D 5/0487; B62D 5/0496; H02K 11/26; H02P 1/00; H02P 3/00; H02P 6/14; H02P 27/04; H02P 27/06; H02P 23/00; H02P 27/00; H02P 1/46; H02P 3/18; H02P 41/00; H02P 41/02
USPC ..... 318/400.01, 400.02, 700, 701, 727, 779, 318/799, 800, 801, 400.14, 400.15; 363/40, 44, 95, 120, 174, 175; 361/23, 361/30, 36, 6, 65, 90
See application file for complete search history.

(56) References Cited

U.S. PATENT DOCUMENTS

| | | |
|---|---|---|
| 2009/0230898 A1 | 9/2009 | Matsubara |
| 2011/0012543 A1* | 1/2011 | Takizawa ................ B60L 3/003 318/139 |
| 2015/0229246 A1 | 8/2015 | Matsumoto |

FOREIGN PATENT DOCUMENTS

| | | |
|---|---|---|
| JP | H07-177754 A | 7/1995 |
| JP | 2009-225497 A | 10/2009 |
| JP | 2013-176264 A | 9/2013 |
| JP | 2013-243789 A | 12/2013 |
| JP | 2015-72878 A | 4/2015 |
| JP | 2015-073376 A | 4/2015 |
| JP | 2015-141839 A | 8/2015 |
| JP | 2015-154566 A1 | 8/2015 |

OTHER PUBLICATIONS

Japanese Office Action dated Jun. 5, 2018, in connection with corresponding JP Application No. 2016-221432 (7 pgs., including English translation).

* cited by examiner

*Primary Examiner* — Antony M Paul
(74) *Attorney, Agent, or Firm* — Maier & Maier, PLLC

(57) ABSTRACT

Provided is a motor driver including: a converter that converts an AC voltage into a DC voltage; an inverter that inverts the DC voltage into a multi-phase AC voltage for motor driving; a short bar fixed to an output terminal of the converter and an input terminal of the inverter by screw fastening; a first voltage detector that detects a voltage across the output terminals of the converter; a second voltage detector that detects a voltage across the input terminals of the inverter; and a reporting unit that provides, when a difference between the voltage detected by the first voltage detector and the voltage detected by the second voltage detector exceeds a predetermined threshold, a report relating thereto.

2 Claims, 3 Drawing Sheets

MOTOR DRIVER

CROSS-REFERENCE TO RELATED APPLICATIONS

This application claims the benefit of Japanese Patent Application No. 2016-221432, the content of which is incorporated herein by reference.

TECHNICAL FIELD

The present invention relates to a motor driver.

BACKGROUND ART

There is conventionally known a motor driver (see, for example, PTL 1). The motor driver includes a converter unit that converts an alternating current (AC) voltage into a direct current (DC) voltage, a DC link unit that smooths the DC voltage with a condenser to generate a DC link voltage, an inverter unit that inverts the DC link voltage into a multi-phase AC voltage for motor driving, a short bar that provides electrical connection between a terminal of the DC link unit and a terminal of the inverter unit, and a DC link voltage detection unit that detects the DC link voltage.

CITATION LIST

Patent Literature

{PTL 1}
Japanese Unexamined Patent Application, Publication No. 2015-154566 A

SUMMARY OF INVENTION

An aspect of the present invention provides a motor driver including: a converter that converts an AC voltage into a DC voltage and outputs the DC voltage; an inverter that inverts the input DC voltage into a multi-phase AC voltage for motor driving; a short bar fixed to an output terminal of the converter and an input terminal of the inverter by screw fastening; a first voltage detector that detects a voltage across the output terminals of the converter; a second voltage detector that detects a voltage across the input terminals of the inverter; and a reporting unit that provides, when a difference between the voltage detected by the first voltage detector and the voltage detected by the second voltage detector exceeds a predetermined threshold, a report relating thereto.

DESCRIPTION OF EMBODIMENTS

Hereinafter, a motor driver 1 according to one embodiment of the present invention will be described with reference to the drawings.

Figure 1:
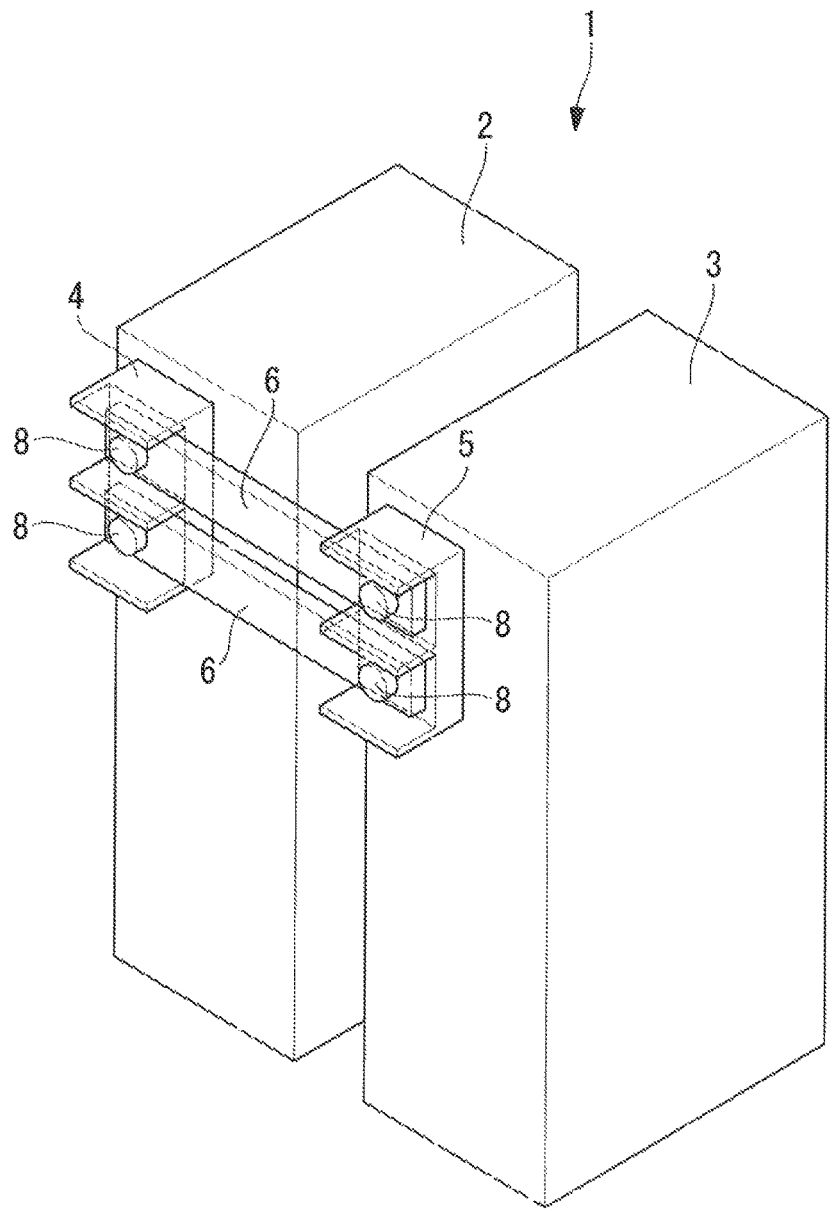
FIG. 1 is a perspective view illustrating a motor driver according to one embodiment of the present invention.
Figure 2:
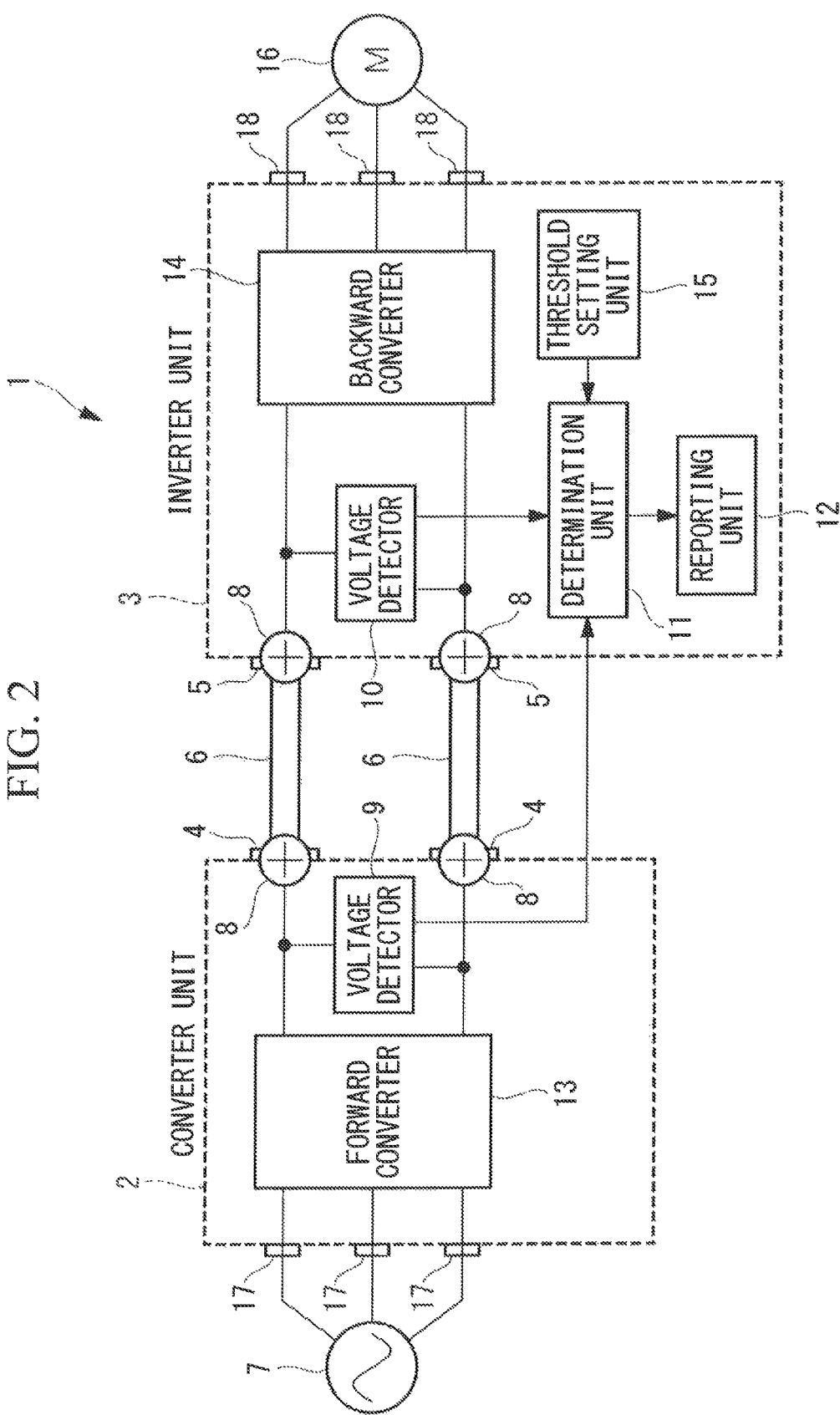
FIG. 2 is a block diagram illustrating an internal structure of the motor driver of FIG. 1.

The motor driver 1 according to the present embodiment includes, as illustrated in FIG. 2, a converter unit (converter) 2 that converts an AC voltage into a DC voltage, an inverter unit (inverter) 3 that converts the DC voltage into a multi-phase AC voltage for motor driving, and short bars 6 fixed to an output terminal 4 of the converter unit 2, and an input terminal 5 of the inverter unit 3 with screws to provide electric connection between both the terminals 4 and 5. In the drawing, reference sign 8 designates a screw.

The converter unit 2 is provided with a DC link unit (illustration omitted) that smooths the converted DC voltage with a condenser (illustration omitted) to generate a DC link voltage. The DC link voltage is output to the output terminal 4.

As illustrated in FIG. 2, the motor driver 1 according to the embodiment includes a first voltage detector (voltage detector) 9 that detects a voltage across the output terminals 4 of the converter unit 2, a second voltage detector (voltage detector) 10 that detects a voltage across the input terminals 5 of the inverter unit 3, a determination unit 11 provided in the inverter unit 3, the determination unit 11 determining whether or not a difference between the voltage detected by the first voltage detector 9 and the voltage detected by the second voltage detector 10 exceeds a predetermined threshold, and a reporting unit 12 that provides, when the difference is determined to exceed the threshold as a result of determination made by the determination unit 11, a report relating thereto. In the drawing, reference sign 13 designates a forward converter, and reference sign 14 designates a backward converter.

The determination unit 11 in the inverter unit 3 is connected to a threshold setting unit 15, which enables an operator to set a proper threshold in accordance with the form of the short bars 6.

For example, the reporting unit 12 is constituted from a monitor, a buzzer, indicator lamp, or the like so as to be able to report to the outside that the voltage difference exceeds the threshold by voice, light, characters, image display or the like.

The operation of the thus-configured motor driver 1 according to the present embodiment will be described below.

To drive the motor 16 with the motor driver 1 according to the present embodiment, an AC source 7 is connected to an input terminal 17 of the converter unit 2, and the motor 16 is connected to an output terminal 18 of the inverter unit 3.

The converter unit 2 converts an AC voltage of the AC source 7 into a DC voltage. The converted DC voltage is smoothed by the DC link unit included in the converter unit 2 to generate a DC link voltage, and the DC link voltage is output across the output terminals 4. The DC link voltage is supplied across the input terminals 5 of the inverter unit 3 through the short bars 6. The inverter unit 3 converts the DC link voltage into a multi-phase AC voltage for motor driving and outputs it to the motor 16. As a consequence, the motor 16 is rotationally driven.

In this case, when no screw fastening failure is generated in the screws 8 used to connect the short bars 6 to the output terminal 4 of the converter unit 2 and the input terminal 5 of the inverter unit 3, the voltage detected by the first voltage detector 9 is equal to the voltage detected by the second voltage detector 10, and therefore the voltage difference is maintained at or below the threshold. As a result, the reporting unit 12 does not provide a report.

In contrast, when the screw fastening failure is generated in the screws 8 used to connect the short bars 6 to the output terminal 4 of the converter unit 2 and the input terminal 5 of the inverter unit 3, the contact resistance at the portion of the screw fastening failure increases and a voltage drop occurs. As a result, the voltage detected by the first voltage detector 9 becomes different from the voltage detected by the second voltage detector 10, and the voltage difference may exceed a threshold. Therefore, in this case, the reporting unit 12 provides a report.

More specifically, in the motor driver 1 according to the present embodiment, it is not necessary to periodically monitor the fastening condition of the screws 8 of the short bars 6 through marking and the like. The fastening condition of the screws 8 can easily be confirmed by the report provided by the reporting unit 12. As a result, the present invention can provide an advantage that the working time taken for monitoring the screw fastening failure can considerably be reduced.

A description is given of one example of the motor driver 1, in which a three-phase voltage with an effective value of 200V is input into the converter unit 2, and the current flowing through the short bars 6 has 10A. In this motor driver 1, a contact resistance of 1Ω is assumed to be generated between the output terminal 4 and the short bars 6 due to a screw fastening failure of the short bars 6.

If there is no screw fastening failure, the voltage across the output terminals 4 of the converter unit 2 and the voltage across the input terminals 5 of the inverter unit 3 are about 283 Vdc (200V×√2).

When the screw fastening failure is generated in the screws 8 of the inverter unit 3, a voltage drop of 10 Vdc (10A×1Ω) occurs between the input terminal 5 of the inverter unit 3 and the short bars 6. Consequently, the voltage across the input terminals 5 of the inverter unit 3 becomes 273 Vdc. Since the difference between the voltage across the output terminals 4 of the converter unit 2 and the voltage across the input terminals 5 of the inverter unit 3 becomes 10 Vdc, setting the threshold to 10V or below makes it possible to detect the screw fastening failure and to provide a report relating thereto.

In this case, the threshold can be obtained from the allowable heat amount of the short bars 6 and the current (for example, current that can drive the motor 16) flowing through the short bars 6.

For example, in the above example, the current flowing through the short bars 6 is 10A, and the contact resistance is 1Ω. Accordingly, the amount of heat generated in the portion of the contact resistance becomes 100W (10A×10A×1Ω).

When the cross sectional area of the short bars 6 is large and the allowable heat amount thereof is large, the generated heat amount of 100W is allowable. Accordingly, a value exceeding 10V (for example, 15V or 20V) can be set as a threshold. When the threshold for detecting the screw fastening failure is set to 15V, the screw fastening failure is detected when the screws 8 is loosened to the point that the contact resistance of the screws 8 with the short bars 6 becomes 1.5Ω. The amount of heat generated in the portion of the contact resistance in this case is 150W (10A×10A×1.5Ω).

Meanwhile, when the cross sectional area of the short bars 6 is small and the allowable heat amount thereof is small, the generated heat amount of 100W may be problematic. In this case, a value of less than 10V (for example, 5V or 8V) is set as a threshold, so that the screw fastening failure can be detected. When the threshold is set to 5V, the amount of heat generated in the portion of the contact resistance when the screw fastening failure is detected is 50W.

Figure 3:
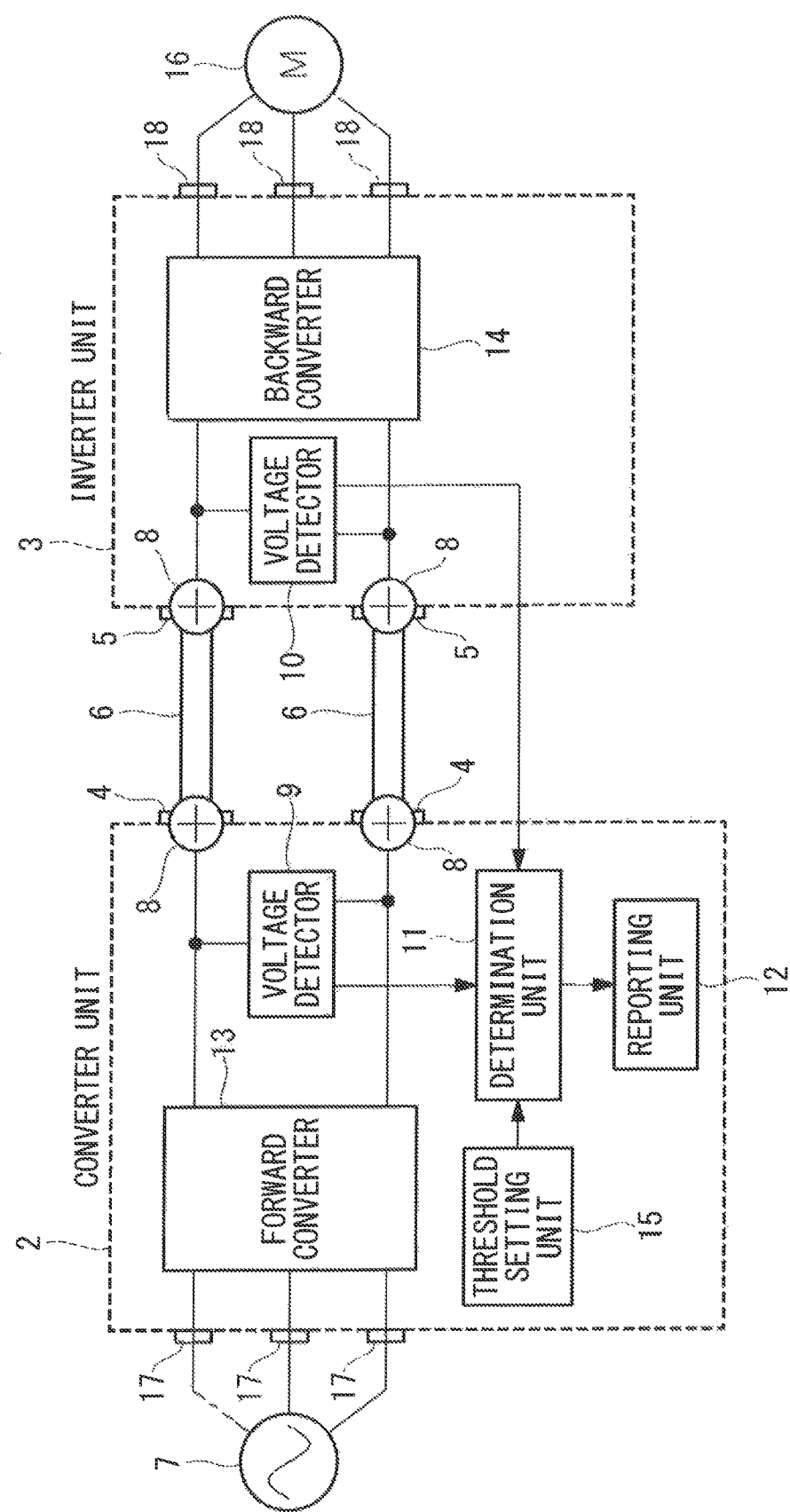
FIG. 3 is a block diagram illustrating a modified example of the motor driver of FIG. 2.

In the present embodiment, the determination unit 11, the threshold setting unit 15, and the reporting unit 12 are provided in the inverter unit 3. However, these component members may be provided in the converter unit 2 in place of the inverter unit 3 as illustrated in FIG. 3.

From the above-described embodiment, the following invention is derived.

An aspect of the present invention provides a motor driver including: a converter that converts an AC voltage into a DC voltage and outputs the DC voltage; an inverter that inverts the input DC voltage into a multi-phase AC voltage for motor driving; a short bar fixed to an output terminal of the converter and an input terminal of the inverter by screw fastening; a first voltage detector that detects a voltage across the output terminals of the converter; a second voltage detector that detects a voltage across the input terminals of the inverter; and a reporting unit that provides, when a difference between the voltage detected by the first voltage detector and the voltage detected by the second voltage detector exceeds a predetermined threshold, a report relating thereto.

According to the present aspect, an AC voltage supplied from a power source is converted into a DC voltage by the converter, and is then input into the inverter through the short bar. The DC voltage is then converted into a multi-phase AC voltage for motor driving and is supplied to the motor, so that the motor is driven. In this case, when the short bar fixed to the output terminal of the converter and the input terminal of the inverter with screws has a screw fastening failure, a voltage drop occurs due to contact resistance in a portion where the screw fastening failure is generated. As a result, the difference between the voltage detected by the first voltage detector and the voltage detected by the second voltage detector exceeds a predetermined threshold.

When the voltage difference exceeds the threshold, the reporting unit provides a report relating thereto. Accordingly, the report provided by the reporting unit enables an operator to easily and reliably confirm the screw fastening failure without periodic visual confirmation regarding fastening conditions of all the screws. That is, periodic inspection of all the screws used to fasten all the short bars is not performed, and therefore the working time taken for the inspection can drastically be reduced.

In the above aspect, the motor driver may include a threshold setting unit that sets the threshold. Such configuration makes it possible to set a proper threshold depending on an allowable current and an allowable heat amount of the short bar. As a result, the screw fastening failure can be reported without causing excessive heat generation or to prevent excessive reporting of the screw fastening failure.

REFERENCE SIGNS LIST

1 Motor driver
2 Converter unit (converter)
3 Inverter unit (inverter)
4 Output terminal
5 Input terminal
6 Short bar
9 First voltage detector
10 Second voltage detector
15 Threshold setting unit

The invention claimed is:
1. A motor driver comprising:
a converter that converts an AC voltage into a DC voltage and outputs the DC voltage;
an inverter that inverts the input DC voltage into a multi-phase AC voltage for motor driving;

a short bar fixed to an output terminal of the converter and an input terminal of the inverter by screw fastening;
a first voltage detector that detects a voltage across the output terminals of the converter;
a second voltage detector that detects a voltage across the input terminals of the inverter; and
a reporting unit that provides, when a difference between the voltage detected by the first voltage detector and the voltage detected by the second voltage detector exceeds a predetermined threshold, a report relating thereto.

2. The motor driver according to claim 1, further comprising a threshold setting unit that sets the threshold.

\* \* \* \* \*

UNITED STATES PATENT AND TRADEMARK OFFICE
CERTIFICATE OF CORRECTION

PATENT NO. : 10,090,794 B2
APPLICATION NO. : 15/724552
DATED : October 2, 2018
INVENTOR(S) : Tomokazu Yoshida It is certified that error appears in the above-identified patent and that said Letters Patent is hereby corrected as shown below:

On the Title Page

Column 1, add "(30) Foreign Application Priority Data November 14, 2016 (JP) 2016-221432"

Signed and Sealed this
Sixteenth Day of July, 2019

Andrei Iancu
*Director of the United States Patent and Trademark Office*